United States Patent
Söderström

(10) Patent No.: US 11,549,785 B2
(45) Date of Patent: Jan. 10, 2023

(54) ARRANGEMENT AND METHOD FOR AUTOALIGNMENT OF A STABILIZED SUBSYSTEM

(71) Applicant: SAAB AB, Linköping (SE)

(72) Inventor: Fredrik Söderström, Järfälla (SE)

(73) Assignee: SAAB AB, Linköping (SE)

( * ) Notice: Subject to any disclaimer, the term of this patent is extended or adjusted under 35 U.S.C. 154(b) by 406 days.

(21) Appl. No.: 16/623,813

(22) PCT Filed: Jun. 18, 2018

(86) PCT No.: PCT/SE2018/050638
§ 371 (c)(1),
(2) Date: Dec. 18, 2019

(87) PCT Pub. No.: WO2018/236270
PCT Pub. Date: Dec. 27, 2018

(65) Prior Publication Data
US 2020/0124382 A1    Apr. 23, 2020

(30) Foreign Application Priority Data
Jun. 22, 2017   (SE) .................................... 1750807-8

(51) Int. Cl.
*F41G 5/16*    (2006.01)
*G01S 7/40*    (2006.01)
(Continued)

(52) U.S. Cl.
CPC .............. *F41G 5/16* (2013.01); *G01S 7/4026* (2013.01); *H01Q 1/185* (2013.01); *H01Q 1/34* (2013.01); *H01Q 3/08* (2013.01)

(58) Field of Classification Search
CPC ..... F41G 5/16; F41G 5/00; F41G 5/14; F41G 5/18; F41G 5/20; F41G 5/22; F41G 5/24;
(Continued)

(56) References Cited

U.S. PATENT DOCUMENTS 2,592,417 A * 4/1952 Hale .................... F41G 5/16
244/175
2,714,837 A * 8/1955 Buchanan ............... F41G 5/16
89/41.09
(Continued)

FOREIGN PATENT DOCUMENTS

EP   1986016 A1   10/2008
GB   1146847 A    3/1969

OTHER PUBLICATIONS

Extended European Search Report in corresponding European Application No. 18821097.5 dated Feb. 12, 2021 (9 pages).
(Continued)

*Primary Examiner* — Nkeisha Smith
(74) *Attorney, Agent, or Firm* — Sage Patent Group

(57) ABSTRACT

The present invention relates to a director mount arrangement for automatic alignment of a subsystem relative to a platform, wherein said director mount arrangement is arranged to pivotably support the subsystem. The director mount arrangement comprises a pivot frame arrangement and a control system. The control system comprises a control unit arranged to generate control signals so as to control the orientation of and stabilize the subsystem. The control signals are generated based on angular rate of subsystem and orientation operating commands provided from an operator. The control unit further generates estimated control signals based on platform orientation information and determine a difference between the control signals and the estimated control signals, wherein the difference is indicative of mechanical misalignments between the subsystem and the platform. The control unit further generates alignment corrections based on the determined difference so as to automatically align the subsystem relative to the platform.

13 Claims, 5 Drawing Sheets

(51) Int. Cl.
  *H01Q 1/18*   (2006.01)
  *H01Q 1/34*   (2006.01)
  *H01Q 3/08*   (2006.01)

(58) Field of Classification Search
  CPC ........ G01S 7/4026; H01Q 1/185; H01Q 1/34;
                                              H01Q 3/08
  See application file for complete search history.

(56) References Cited

U.S. PATENT DOCUMENTS

| | | | |
|---|---|---|---|
| 2,715,776 A * | 8/1955 | Knowles | F41G 5/16 |
| | | | 235/407 |
| 5,517,204 A | 5/1996 | Murakoshi et al. | |
| 5,977,906 A | 11/1999 | Ameen et al. | |
| 7,123,201 B2 * | 10/2006 | Caudle | H01Q 1/185 |
| | | | 343/882 |
| 7,337,650 B1 | 3/2008 | Preston et al. | |
| 9,886,040 B1 * | 2/2018 | Kelly | F41A 27/28 |
| 10,365,067 B2 * | 7/2019 | Keller | F41G 3/16 |
| 2007/0144338 A1 * | 6/2007 | Gerstadt | F41A 27/28 |
| | | | 89/41.09 |
| 2012/0001816 A1 | 1/2012 | Blaney | |

OTHER PUBLICATIONS

International Search Report and Written Opinion in corresponding International Application No. PCT/SE2018/050638 dated Aug. 30, 2018 (12 pages).

\* cited by examiner

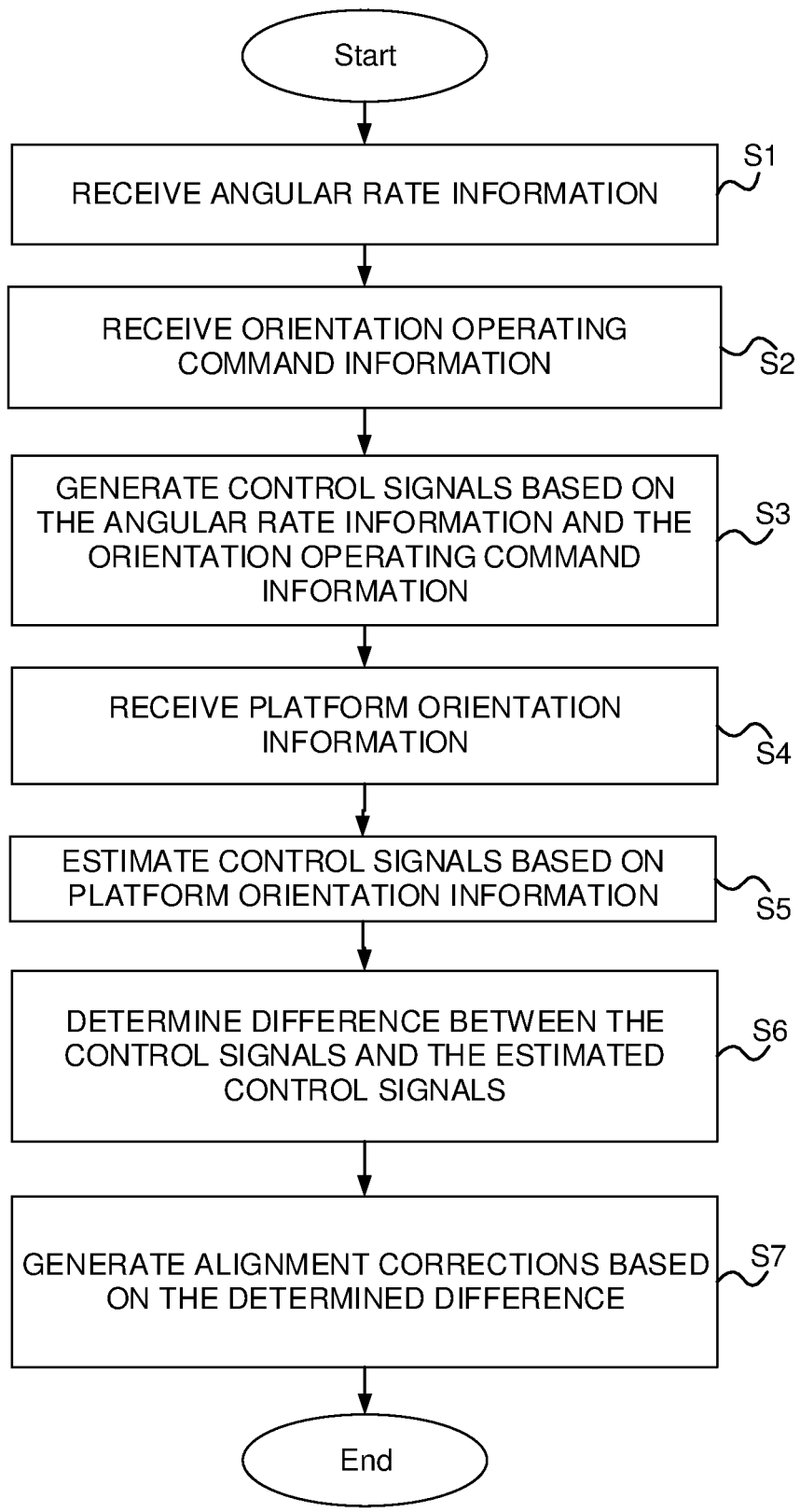

ARRANGEMENT AND METHOD FOR AUTOALIGNMENT OF A STABILIZED SUBSYSTEM

CROSS-REFERENCE TO RELATED APPLICATIONS

This application is a U.S. National Stage application of PCT/SE2018/050638, filed Jun. 18, 2018 and published on Dec. 27, 2018 as WO2018/236270, which claims the benefit of Swedish Patent Application No. 1750807-8, filed Jun. 22, 2017, all of which are hereby incorporated by reference in their entireties.

TECHNICAL FIELD

The present invention relates to an arrangement for automatic alignment of a subsystem according to the preamble of claim 1. The present invention also relates to a method, a platform and a computer program product.

BACKGROUND ART

Today there exist numerous examples of subsystems having the need for being controllably oriented and stabilized. Typically these subsystems having are intended for mounting to a moving platform such as land/sea/air/space based vehicles or crafts. The reason behind the need for stabilization is the need to be able to accurately control the orientation of a pointing direction/line-of-sight of the subsystem, such as the line-of-sight of a sensor system, independently from movements of the platform to which the subsystem is mounted. In order to enable facilitated control of the subsystem it also needs to be aligned with the platform so that the platform and the subsystem, its associated systems, share a common view about orientation/direction so as to be able to command the subsystem, i.e. pointing direction of the subsystem, to assume a certain orientation.

Examples of the above mentioned subsystems comprises: weapon systems; fire control systems, target tracking systems, surveillance systems, communications systems, such as satellite communication links and sensor systems, such as electro-optical sensor systems or radar systems.

For some of these types of subsystems and depending on application the need for accuracy in terms of being able to control/maintain/know the exact line-of-sight for the subsystem is extremely high. An aspect that affects the above mentioned accuracy of the subsystem is for example mechanical misalignments, i.e. small angular offsets between the subsystem and a reference frame of the platform. These mechanical misalignments typically inevitably arise during mounting of the subsystem to the platform or due to operational factors/external factors related to the platform and/or the subsystem. Such factors may for example relate to solar radiation or mechanical wear.

Today in order to compensate for these mechanical misalignments costly external measurement/calibration equipment is required in order to measure the mechanical misalignments so as to allow for compensating/calibrating for the mechanical misalignments. Applied to platforms such as naval ships, having subsystems, such as fire control systems and weapon systems, this translate into that the ship need to spend up to a day or more in the harbour in order to perform the measurement/calibration procedure. This also results in that the ship needs to return to harbour following the appearance of mechanical misalignments introduced by operational factors/external factors.

Thus, there exists a need to present improvement within alignment of subsystems.

OBJECTS OF THE INVENTION

An object of the present invention is to provide a director mount arrangement, mountable to a platform, for orientable and stabilizable support of a subsystem and automatic alignment of the subsystem relative to the platform.

An additional object of the present invention is to provide a director mount arrangement for automatic alignment of the subsystem relative to the platform, which can perform alignment during operation of the platform.

An additional object of the present invention is to provide a director mount arrangement for automatic alignment of the subsystem which is simple and cost effective.

SUMMARY OF THE INVENTION

These and other objects, apparent from the following description, are achieved by a director mount arrangement for automatic alignment of a subsystem and a method for automatic alignment of a subsystem as set out in the appended independent claims. Preferred embodiments of the method and the arrangement are defined in appended dependent claims. These and other objects are also achieved by a platform and a computer program product which when executed by a computer cause the computer to carry out the steps of the method.

According to the invention the objects are achieved by a director mount arrangement for automatic alignment of a subsystem relative to a platform, wherein said director mount arrangement is arranged mountable to the platform and to pivotably support the subsystem. The arrangement comprises a pivot frame arrangement for pivotably supporting the subsystem. The arrangement further comprises a control system for controllably orienting and stabilizing the subsystem. Said control system comprising servomotors arranged to control the orientation of and stabilize the subsystem and a control unit (60) arranged to generate control signals for the servomotors. The control unit is arranged to generate the control signals for the servomotors based on angular rate information and based on orientation operating command information. The angular rate information corresponds to information indicative of the angular rate of the subsystem, and is received by the control unit from one or more angular rate sensors arranged in connection to the subsystem. The orientation operating command information relates to information corresponding to a desired orientation of the subsystem, provided from an operator of the subsystem. The control unit is further arranged connectable to a main gyro of the platform in order to receive platform orientation information, indicative of the orientation of the platform. The control unit further is arranged to generate estimates of the control signals based on the platform orientation information. The control unit is further arranged to determine a difference between the control signals and the estimated control signals, wherein said difference is indicative of mechanical misalignments of the subsystem relative to the platform. The control unit is further arranged to generate alignment corrections based on the determined difference, wherein said alignment corrections compensate for the mechanical misalignments so as to automatically align the subsystem relative to the platform.

Hereby is achieved a simple, fast and cost effective alignment solution for a director mount arrangement which enables automatic or semi-automatic alignment of the subsystem relative to the platform apart from enabling orienting and stabilizing the subsystem. Thus the solution effectively compensate for mechanical misalignments appearing between the subsystem and the platform. The solution according to the present invention do not as traditional solutions rely on using expensive and complex external measurement equipment, which is time consuming to use, or integrating additional expensive and complex sensor technology such as inertial navigations systems (INS) and/or gyroscopes into the subsystem/director mount arrangement for measuring the mechanical misalignments so as to allow compensating for the mechanical misalignments. Instead the solution according to the present can use information from less costly/complex sensors already existing in director mount arrangements for an additional purpose in the form of compensating for the mechanical misalignments. Today these sensors provide angular rate feedback for the control system of the director mount arrangement so as to enable stabilizing the subsystem supported by the director mount arrangement.

According to an embodiment of the arrangement the control unit is arranged to apply coordinate transformations to the platform orientation information provided from the main gyro transforming the platform orientation information into a horizontal coordinate system so as to enable generating the estimates of the control signals.

According to an embodiment of the arrangement the control unit is arranged to apply Kalman filtering so as to generate the estimates and/or to determine the difference.

Hereby is achieved that the estimates and/or difference effectively can be determined over a period of time.

According to an embodiment of the arrangement the control unit is arranged determine the difference control signals and the estimated control signals while the subsystem is blocked from movements caused by the orientation operating commands and while the platform performs a maneuver.

Hereby is achieved that determination of the difference is facilitated by means of the parameter involved in the determination/estimation becomes fully observable.

According to an embodiment of the arrangement the servomotors comprises an azimuth servomotor for controlling the orientation of the subsystem in the azimuth direction and an elevation servomotor for controlling the orientation of the subsystem in the elevation direction.

According to an embodiment of the arrangement the angular rate sensors of the orientation and stabilization system comprises an azimuth angular rate sensor for sensing the angular rate of the subsystem along the azimuth direction and an elevation angular rate sensor for sensing the angular rate of the subsystem along the elevation direction.

According to an embodiment of the arrangement the director mount arrangement is operated from a command unit associated with the platform, whereby the director mount arrangement is arranged connectable to the command unit.

According to the invention the objects are also achieved by a method for automatic alignment of a subsystem relative to a), wherein the subsystem is pivotably supported by a director mount arrangement (40) for orienting and stabilizing the subsystem, said director mount arrangement being mountable to the platform. The method comprising the steps of:

receiving, in a control unit of the director mount arrangement, angular rate information, indicative of the angular rate of subsystem, provided from angular rate sensors; receiving, in the control unit, orientation operating command information, indicative of a desired orientation of the subsystem, provided from an operator of the system; generating, in the control unit, control signals for servomotors, of the director mount arrangement, based on the received angular rate information and the received orientation operating command information, so as to cause the servomotors to orient and stabilize the subsystem; receiving, in the control unit, platform orientation information, indicative of the orientation of the platform, provided from a main gyro, connectable to the control unit; generating, in the control unit, estimates of the control signals based on the platform orientation information; determining, in the control unit, a difference between the generated control signals and the generated estimated control signals, wherein said difference is indicative of mechanical misalignments of the subsystem relative to the platform; and generating, in the control unit, alignment corrections based on the determined difference, wherein said alignment corrections compensate for the mechanical misalignments so as to automatically align the subsystem relative to the platform.

According to the invention the objects are also achieved by a computer program product for automatic alignment of a stabilized subsystem.

BRIEF DESCRIPTION OF THE DRAWINGS

For a better understanding of the present invention reference is made to the following detailed description when read in conjunction with the accompanying drawings, wherein like reference characters refer to like parts throughout the several views, and in which:

FIG. 9 schematically illustrates a flow diagram of a method for automatically aligning the subsystem, as described with reference to FIGS. 1A and 3, relative to a platform by means of the director mount arrangement as described with reference to FIGS. 6 and 7 according to an embodiment of the present invention.

DETAILED DESCRIPTION

Figure 1A:
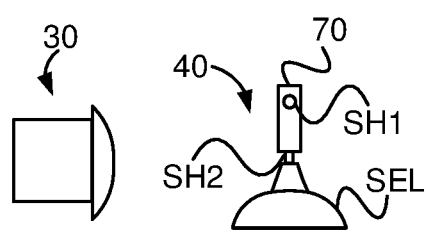
FIG. 1A schematically illustrates a side view of a subsystem and a director mount arrangement for use with the subsystem, wherein the subsystem is to be automatically aligned by the director mount arrangement according to an embodiment of the present invention.

FIG. 1A schematically illustrates a side view of a subsystem and a director mount arrangement for use with the subsystem, wherein the subsystem is to be automatically aligned by the director mount arrangement according to an embodiment of the present invention.

Thus, in FIG. 1A, a subsystem 30 and a director mount arrangement 40 are shown.

The subsystem 30, illustrated in FIG. 1A, is a radar and optronic tracking fire director for use on naval ships. However, the invention is not limited to a subsystem of the above mentioned type the subsystem may comprise any subsystem having the need for control and stabilization of a pointing direction of the subsystem wherein a high level of accuracy in terms of the pointing direction is an important factor. Thus, the subsystem may for example be comprised of a subsystem in the form of: a weapon system, a fire control system, a surveillance system, a tracking system, a sensor system, a communication system such as one or more satellite data links, or a combination thereof. The subsystem may also comprise a combination of more than one type of system such as for example one or more electro-optical sensors systems and one or more radar and/or acoustical system.

Figure 1B:
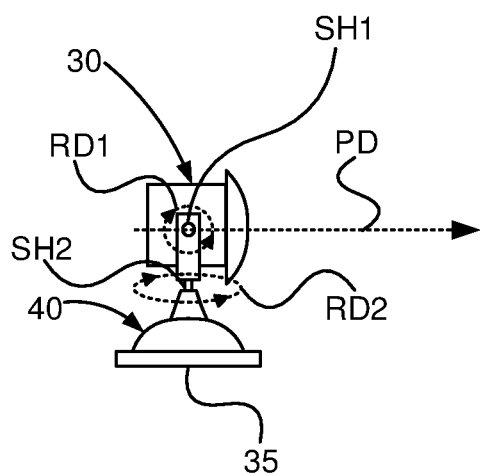
FIG. 1B schematically illustrates a side view of the subsystem, illustrated in FIG. 1A, mounted to and supported by the director mount arrangement illustrated in FIG. 1A, wherein the subsystem is to be automatically aligned by the director mount arrangement according to an embodiment of the present invention.

The director mount arrangement 40 is arranged to pivotably support the subsystem as for example shown in FIG. 1B. With continued reference to FIG. 1A the director mount arrangement 40 comprises a body SEL in the form of a support element. The director mount arrangement 40 further comprises a pivot frame arrangement 70. The pivot frame arrangement is arranged rotatably attachable to the subsystem 30 via a first shaft SH1. The pivot frame arrangement is further arranged rotatably attachable to the body SEL via a second shaft SH2.

Thus, upon inducement of a rotational torque into the second shaft SH2 the pivot frame arrangement is caused to rotate around a main direction of extension of the second shaft, whereby also the subsystem, when attached to the pivot frame arrangement via the first shaft, is caused to rotate around said main direction of extension of the second shaft. Upon inducement of a rotational torque into the first shaft, the subsystem, when attached to the pivot frame arrangement via the first shaft, is caused to rotate around a main direction of extension of the first shaft. More information about how the director mount arrangement enables causing rotation of the shafts will be described with reference to FIG. 6.

FIG. 1B schematically illustrates a side view of the subsystem, illustrated in FIG. 1A, mounted to and supported by the director mount arrangement illustrated in FIG. 1A, wherein the subsystem is to be automatically aligned by the director mount arrangement according to an embodiment of the present invention.

Thus, in FIG. 1B the subsystem 30 is illustrated mounted to the director mount arrangement so that the subsystem is pivotably supported by the director mount arrangement. In more detail the subsystem is arranged to be pivotably supported by a director mount arrangement 40 so as to, by means of a control system, such as a control system of the director mount arrangement described in more detail with reference to FIG. 6, allow controllably pivoting the subsystem whereby the subsystem can be controlled so as to orient a pointing direction PD of the subsystem into an orientation as desired.

The subsystem supported by the director mount arrangement is further arranged to be stabilized by means of the control system as described in more detail with reference to FIG. 6.

Thus, the pivotable director mount 40 is arranged to support the subsystem 30 and arranged to controllably pivot the subsystem for a desired movement of the subsystem in a first rotational direction RD1 corresponding to movement of the subsystem along an elevation direction as described in more detail with reference to FIG. 2A and in a second rotational direction RD2 corresponding to movement of the subsystem along an azimuth direction as described in more detail with reference to FIG. 2B. This allows controlling a pointing direction PD, i.e. a line-of-sight, of the subsystem in azimuth and elevation direction as desired for operation of the subsystem.

The director mount arrangement may also comprise a base plate element 35 arranged to facilitate mounting of the director mount arrangement together with the subsystem to a platform as described in more detail with reference to FIG. 3.

Figure 2A:
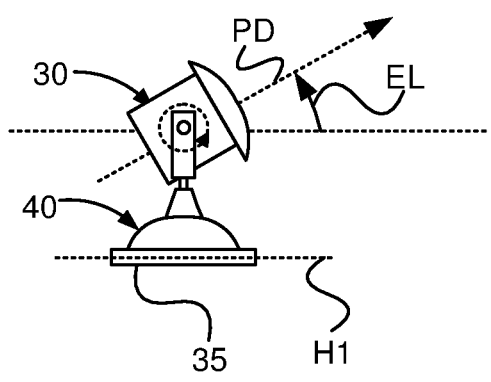
FIG. 2A schematically illustrates a side view of the subsystem when mounted to the director mount arrangement, as illustrated in FIG. 1B, wherein the subsystem is arranged to be automatically aligned by means of the director mount arrangement according to an embodiment of the present invention wherein the subsystem is pivoted in an elevation direction.

FIG. 2A schematically illustrates a side view of the subsystem when mounted to the director mount arrangement, as illustrated in FIG. 1B, wherein the subsystem is arranged to be automatically aligned by means of the director mount arrangement according to an embodiment of the present invention wherein the subsystem is pivoted in an elevation direction.

As seen in FIG. 2A the orientation of the subsystem 30 is arranged to be controlled by means of the control system of the director mount arrangement, described in more detail with reference to FIG. 6, so as to cause movement of the subsystem along the elevation direction.

In more detail since the subsystem 30 is arranged supported by the pivotable director mount arrangement 40 orientation of the pointing direction PD of the subsystem along the elevation direction can be controlled by means of controlling inducement of rotational torque into the first shaft as described above with reference to FIGS. 1A and 1B.

Thus, by controlling the orientation of the subsystem, by means of the director mount arrangement, along the elevation direction, so as to cause the pivotable desired orientation of the pointing direction PD of the subsystem 30, the subsystem is caused to move and assume an orientation resulting in that the pointing direction PD of the subsystem assume an elevation angle EL as desired.

Elevation refers to an angle EL formed between the pointing direction PD and a local horizontal plane H1, such as for example a horizontal plane defined by a section or a reference plane of a platform onto which the subsystem is arranged to be mountable by means of the director mount arrangement as described in more detail with reference to FIG. 3.

Accordingly, by controlling the orientation of the subsystem, by means of the director mount arrangement, along the elevation direction the pointing direction PD of the subsystem 30 can be controlled so as to become aligned with said local horizontal plane or angled upward or downward relative to said local horizontal plane.

As illustrated in FIG. 2A the subsystem is controlled to move so as cause the pointing direction of the subsystem to assume an elevation angle causing the pointing direction PD of the subsystem 30 to become angled slightly upward of said horizontal plane H1.

Figure 2B:
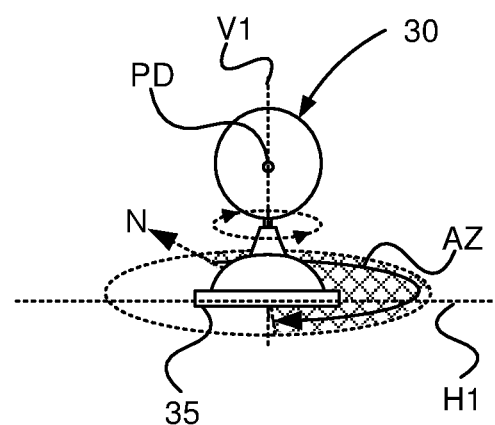
FIG. 2B schematically illustrates a side view of the subsystem when mounted to the director mount arrangement, as illustrated in FIG. 1B, wherein the subsystem is arranged to be automatically aligned by means of the director mount arrangement according to an embodiment of the present invention wherein the subsystem is pivoted in an azimuth direction.

FIG. 2B schematically illustrates a side view of the subsystem when mounted to the director mount arrangement, as illustrated in FIG. 1B, wherein the subsystem is arranged to be automatically aligned by means of the director mount arrangement according to an embodiment of the present invention wherein the subsystem is pivoted in an azimuth direction;

As seen in FIG. 2B the orientation of the subsystem 30 is arranged to be controlled by means of the control system of the director mount arrangement, described in more detail with reference to FIG. 6, so as to cause movement of the subsystem along the azimuth direction.

In more detail since the subsystem 30 is arranged supported by the pivotable director mount arrangement 40 orientation of the pointing direction PD of the subsystem along the azimuth direction can be controlled by means of controlling inducement of rotational torque into the second shaft as described above with reference to FIGS. 1A and 1B.

Thus, by controlling the orientation of the subsystem, by means of the director mount arrangement, along the azimuth direction, the subsystem is caused to move and assume and an orientation resulting in that the pointing direction PD of the subsystem assume an azimuth angle AZ as desired.

Azimuth refers to rotation of the whole subsystem around a vertical axis V1, i.e. an axis orthogonal to the local horizontal plane H1. Typically azimuth is defined in relation to a reference direction in the form of a true north direction N, wherein an azimuth angle of 0 degrees correspond to the pointing direction PD of the subsystem being aligned with the true north direction N.

Accordingly, by controlling the orientation of the subsystem, by means of the director mount arrangement, along the azimuth direction the pointing direction PD of the subsystem 30 can be controlled so as to assume any azimuth angle in the range of 0-360 degree relative to the true north direction or another suitable azimuth reference direction.

As illustrated in FIG. 2B the subsystem 30 is controlled to move so as cause the pointing direction of the subsystem to assume an azimuth angle causing the pointing direction PD of the subsystem 30 to become angled slightly more than 180 degrees relative to the true north direction N.

Figure 3:
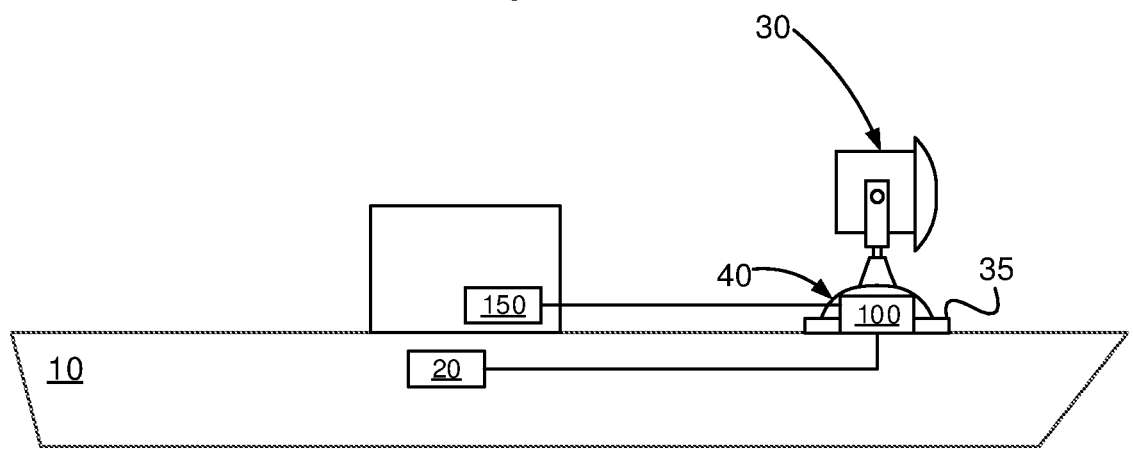
FIG. 3 schematically illustrates a side view of the subsystem illustrated in FIGS. 1, 2A-2B supported by the director mount arrangement mounted to a platform, wherein the subsystem is to be automatically aligned by means of the director mount arrangement according to an embodiment of the present invention.

FIG. 3 schematically illustrates a side view of the subsystem illustrated in FIGS. 1, 2A-2B supported by the director mount arrangement mounted to a platform, wherein the subsystem is to be automatically aligned by means of the director mount arrangement according to an embodiment of the present invention.

In more detail the subsystem 30, such as the subsystem illustrated in FIGS. 1A-1B, 2A-2B is arranged mountable to a platform 10 via a director mount arrangement 40, such as the director mount arrangement 40 described in more detail with reference to FIGS. 1B and 6. The director mount arrangement 40 is arranged for pivotably support of the subsystem. The director mount arrangement further comprises a control system 100 arranged to control pivoting, i.e. orientation, of the subsystem 30 so as to control and stabilize an orientation of the subsystem.

The director mount arrangement may also be arranged mountable to the platform via an interface element in the form of the base plate element 35 so as to facilitate mounting of the director mount element to the platform.

In FIG. 3 the control system 100 is for purpose of illustration shown as positioned in the bottom part of the director mount arrangement. However, parts of the control system 100 also extend to other portions of the director mount arrangement. This is described in more detail with reference to FIG. 6.

The control system 100 is arranged connectable to a main gyro 20 of the platform 10. The main gyro could for example be a true north finding electrically powered three-axis gyroscope or other type of suitable inertial navigation system (INS), which could also be GPS-assisted. The main gyro of the platform is used by the platform for determining/tracking the orientation/attitude of the platform so as to assist in for example navigation of the platform. In more detail the main gyro 20 of the platform is arranged to determine platform orientation information in the form of the attitude, i.e. the orientation in space of the platform. The platform orientation information may for example be determined as roll, pitch and yaw angles, or using other suitable reference frames depending on the application. Upon determination of the roll, pitch and yaw angle the main gyro is arranged to output the determined angular values for use by other system and/or components of the platform. The yaw angle is also often commonly referred to heading which is the term that will be used hereinafter.

In FIG. 3 the subsystem is illustrated as mountable, via the director mount arrangement, to a platform in the form of a ship. However, this is a non-limiting example and without departing from the scope of the invention the subsystem could also be arranged mountable, via the director mount arrangement, to a platform in the form of a moving platform such as any type of land, sea, air or space based vehicle or craft.

The control system 100 is further arranged connectable a command unit 150 of the platform. The command unit of the platform is arranged to provide command signals to the control system so as to cause the control system 100 to orient the subsystem 30 as desired, such as desired by an operator of the subsystem/command unit. This allows the operator of the platform to control the subsystem, i.e. orient the pointing direction of the subsystem as desired. The command unit could also be arranged to receive information from the subsystem 30 so as to provide information sensed by the subsystem to the command unit for presentation or use of the sensed information in the command unit or system associated thereto. The command unit could also be constituted by another subsystem of the platform. As an example the subsystem could be a target tracking system and the command unit could be constituted by a weapon system. The command unit could be arranged to automatically, semi-automatically or manually control the subsystem. The command unit can also be comprised of several different command units which each can in a synchronized fashion can be arranged to interface with the control system of the director mount arrangement so as to allow each command unit to controllably orient the subsystem supported by the director mount arrangement.

Figure 4:
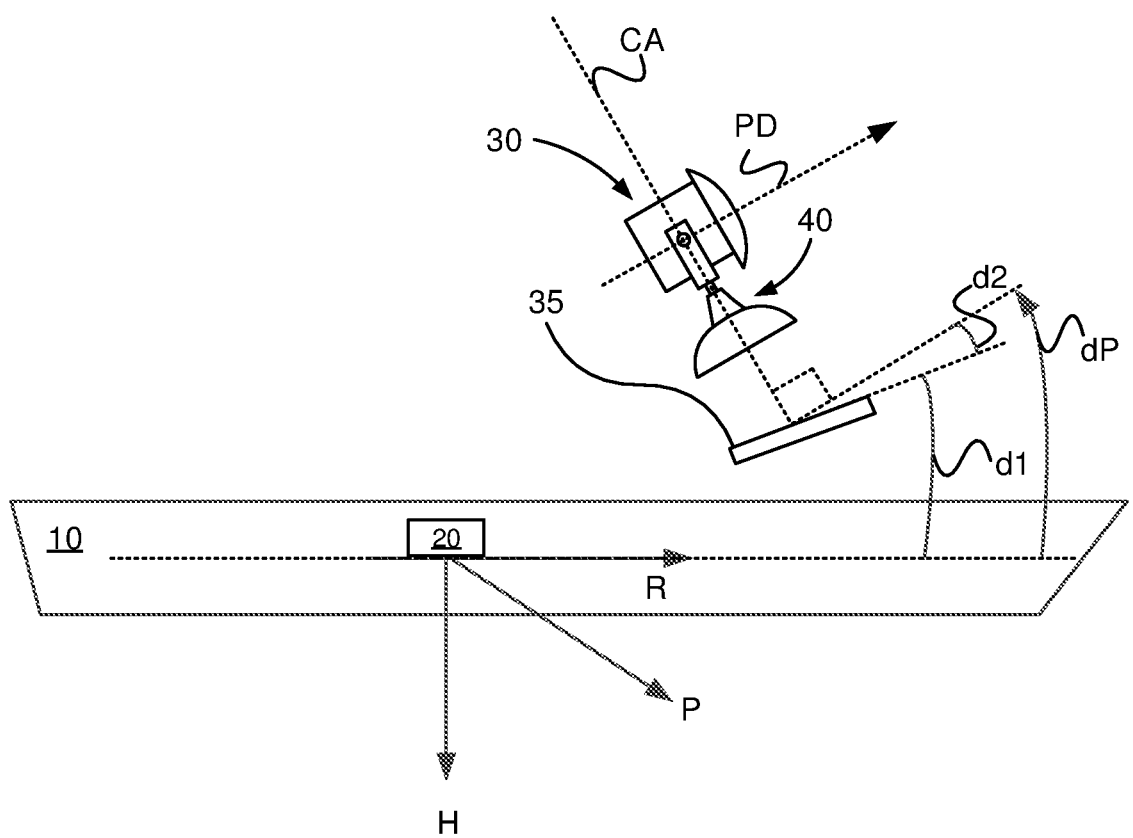
FIG. 4 schematically illustrates a partly exploded side view of the subsystem illustrated in FIGS. 1, 2A-2B mounted via a director mount arrangement to a platform, with a first component of mechanical misalignments present, wherein the subsystem is to be automatically aligned by means of the director mount arrangement according to an embodiment of the present invention.

FIG. 4 schematically illustrates a partly exploded side view of the subsystem illustrated in FIGS. 1B, 2A-2B mounted via a director mount arrangement to a platform, with a first component of mechanical misalignments present, wherein the subsystem is to be automatically aligned by means of the director mount arrangement according to an embodiment of the present invention.

In FIG. 4 the subsystem mounted to the platform via the director mount arrangement and the base plate element have for purpose of illustration been illustrated as separated from each other, i.e. in a partly exploded fashion. However, in reality the base plate element will contact the platform so as to allow the platform to support the base plate element and a bottom portion of the director mount arrangement will contact the base plate element so as to allow the base plate element to support the director mount arrangement provided with the subsystem.

When mounting the subsystem 30 via the director mount arrangement 40 to the platform it is un-avoidable that small mechanical misalignments will appear. These mechanical misalignments may also appear resulting from operation of the platform including the director mount arrangement and/or the subsystem 30 or due to environmental factors affecting the director mount arrangement and/or platform and/or the subsystem 30. The mechanical misalignments results in that the subsystem is not aligned relative to the platform.

In more detail the mechanical misalignments could be introduced between the subsystem and the platform and if a base plate, such as a base plate element 35 described with reference to FIG. 1B, is used for mounting the director mount arrangement to the platform mechanical misalignments could also be introduced between the director mount arrangement and the base plate element and/or between the base plate element and the platform. Depending on the production process for the subsystem and/or the production process for the director mount arrangement and/or the base plate element and/or the mounting process for mounting the subsystem to the director mount arrangement some of the mechanical misalignments appearing between the subsystem and the platform, when the subsystem is mounted via the director mount arrangement to the platform could have been introduced before mounting of the subsystem via the director mount arrangement to the platform, i.e. during the production process.

The effects of the mechanical misalignments leads to that when the control system, as commanded via the command unit, controls the subsystem 30 to move into a certain desired orientation, so as to orient the pointing direction PD of the subsystem into said desired orientation, the actual orientation becomes offset with respect to said desired, i.e. commanded orientation.

The above described mechanical misalignments affect the ability to accurately control the pointing direction of the subsystem 30 since the mechanical misalignments are parameters un-known to the platform, its associated systems including the director mount arrangement/subsystem/control system. Thus, without knowledge of the parameters associated with the mechanical misalignment it is impossible to compensate/calibrate to account for said mechanical misalignment. Today's existing solutions used for measuring and compensating for the mechanical misalignment relies either on the use of a measurement process involving external measurement equipment or on integration of a complete inertial navigation system (INS), reference gyros and accelerometers, or other suitable system as required to determine/measure an orientation/attitude of the subsystem relative to the platform or relative to the earth plane. The latter is typically employed to handle the transfer alignments problem, i.e. the problem associated with initialization and calibration of the guidance system of a missile or a torpedo. Both these options in the form of using external measure equipment and including a complete inertial navigation system in the subsystem and/or associated director mount arrangement are costly. On the other hand the solution proposed by the present invention, as described in more detail with reference to FIG. 6, solves this problem, i.e. allows compensating for the mechanical misalignment, in a simple and cost efficient manner.

As described in more detail with reference to FIG. 3, the main gyro of the platform 10 is arranged to determine the attitude/orientation of the platform in a reference frame in the form of determining how the platform is oriented in terms of angles along the pitch P, roll R and heading H directions.

Figure 5:
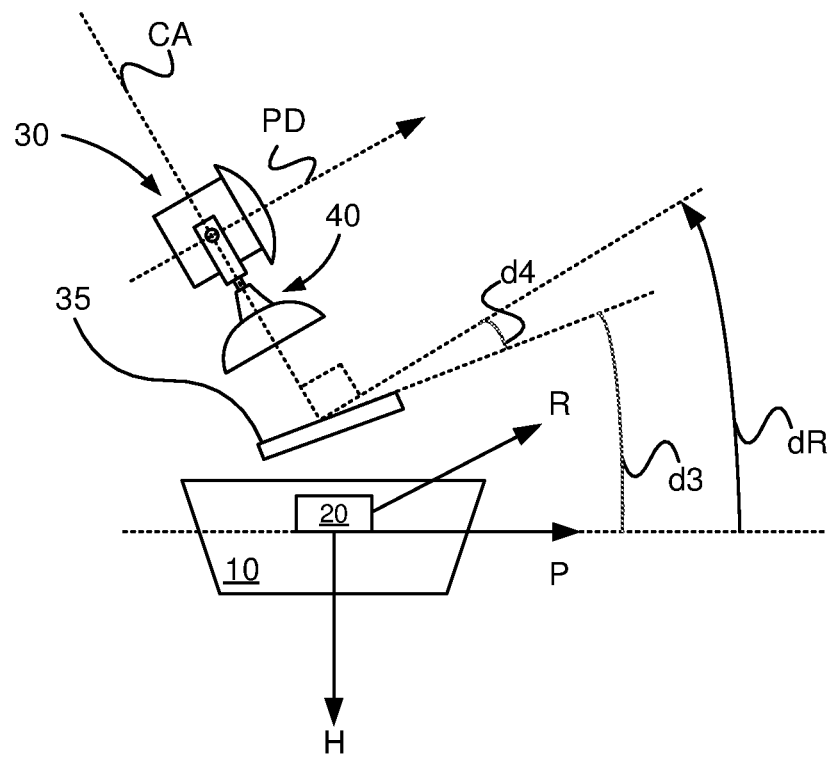
FIG. 5 schematically illustrates a partly exploded side view of the subsystem illustrated in FIGS. 1B, 2A-2B mounted via a director mount arrangement to a platform, with a second component of mechanical misalignments present, wherein the subsystem is to be automatically aligned by means of the director mount arrangement according to an embodiment of the present invention.

Examples of mechanical misalignments defined in the reference frame of the platform are shown in FIG. 4 and FIG. 5, wherein FIG. 4 shows a first component dP of the mechanical misalignments and FIG. 5 shows a second component of the mechanical misalignments. Thus, the mechanical misalignments comprise the first component and the second component. The first component dP of the mechanical misalignments comprises mechanical misalignments, along the pitch direction P, i.e. as defined by the reference frame of the platform 10. In more detail the first component of the mechanical misalignments relates to mechanical misalignments of the director mount arrangement and the subsystem relative to the platform 10, along the pitch P direction.

The first component of the mechanical misalignments, i.e. along the pitch direction, comprises a first angular misalignment subcomponent d1 formed between the platform 10 and the base plate element 35 and a second angular misalignment subcomponent d2 formed between the base plate element 35 and the director mount arrangement 40. Thus, summing up the subcomponents d1, d2 of the first component of the mechanical misalignments gives a total value of the first component of the mechanical misalignments dP, i.e. a total value of the mechanical angular misalignment along the pitch direction P.

In case the director mount arrangement is arranged mounted to the platform without the use of a base plate element the first component of the mechanical misalignment, i.e. mechanical misalignment along the pitch direction, will only comprise one subcomponent in the form of the angular misalignment along the pitch direction formed between the director mount arrangement and the platform.

In FIG. 4 it can be seen that there exist a mechanical misalignment, along the pitch direction, between the director mount arrangement and the base plate element and between the base plate element and the platform since the base plate element is not aligned parallel to the platform, i.e. not aligned parallel to roll R direction of the reference frame of the platform and since the director mount arrangement is not aligned parallel to the base plate element, i.e. a central axis CA extending substantially centrally through the director mount arrangement and the subsystem via the centre of the first shaft and intersecting the pointing direction of the subsystem in the centre of the first shaft is not perpendicular to an axis extending along a top plane of the base plate element.

Accordingly, without compensation for said mechanical misalignments along the pitch direction P the pointing direction PD of the subsystem 30 will become offset by the total mechanical angular misalignment dP in terms of alignment relative to the platform 10. Thus, commanding the director mount arrangement 40, via the command unit 150, to orient the pointing direction PD of the subsystem 30 into a certain orientation in elevation and azimuth will result in that the director mount arrangement orients the subsystem so that its pointing direction is oriented in a different orientation than the commanded orientation due to the offset along the pitch direction P.

It is to be noted that the mechanical misalignments are typically relatively small but which for illustrative purposes been exaggerated in FIG. 4.

FIG. 5 schematically illustrates a partly exploded side view of the subsystem illustrated in FIGS. 1B, 2A-2B mounted via a director mount arrangement to a platform, with a second component of mechanical misalignments present, wherein the subsystem is to be automatically aligned by means of the director mount arrangement according to an embodiment of the present invention.

In FIG. 5 the subsystem mounted to the platform via the director mount arrangement and the base plate element have for purpose of illustration been illustrated as separated from each other, i.e. in a partly exploded fashion. However, in reality the base plate element will contact the platform so as to allow the platform to support the base plate element and a bottom portion of the director mount arrangement will contact the base plate element so as to allow the base plate element to support the director mount arrangement provided with the subsystem.

Examples of mechanical misalignments defined in the reference frame of the platform are shown in FIG. 5, in the form of a second component dR of the mechanical misalignments. The second component dR of the mechanical misalignments comprises mechanical misalignments, along the roll direction R, i.e. as defined by the reference frame of the platform 10. In more detail the second component of the mechanical misalignments relates to mechanical misalignments of the director mount arrangement and the subsystem relative to the platform 10, along the roll R direction.

The second component of the mechanical misalignments, i.e. along the roll direction R, comprises a third angular misalignment subcomponent d3 formed between the platform 10 and the base plate element 35 and a fourth angular misalignment subcomponent d4 formed between the director mount arrangement and the base plate element 35. Thus, summing up the subcomponents d3, d4 of the second component of the mechanical misalignments gives a total value of the second component of the mechanical misalignments dR, i.e. a total value of the mechanical angular misalignment along the roll direction R.

In case the director mount arrangement is arranged mounted to the platform without the use of a base plate element the second component of the mechanical misalignment, i.e. mechanical misalignment along the roll direction, will only comprise one subcomponent in the form of the angular misalignment along the roll direction formed between the director mount arrangement and the platform.

Accordingly, without compensation for said mechanical misalignments along the roll direction R the pointing direction PD of the subsystem 30 will become offset by the total mechanical angular misalignment dR in terms of alignment relative to the platform 10. Thus, commanding the director mount arrangement 40, via the command unit 150, to orient the pointing direction PD of the subsystem 30 into a certain orientation in elevation and azimuth will result in that the director mount arrangement orients the subsystem so that its pointing direction is oriented in a different orientation than the commanded orientation due to the offset along the roll direction R.

In FIG. 5 it can be seen that there exist a mechanical misalignment, along the roll direction, between the director mount arrangement and the base plate element and between the base plate element and the platform since the base plate element is not aligned parallel to the platform, i.e. not aligned parallel to pitch P direction of the reference frame of the platform and since the director mount arrangement is not aligned parallel to the base plate element, i.e. a central axis CA extending substantially centrally through the director mount arrangement and the subsystem via the centre of the first shaft and intersecting the pointing direction of the subsystem in the centre of the first shaft is not perpendicular to an axis extending along a top plane of the base plate element.

Thus, a total value of the mechanical misalignments of the subsystem relative to the platform is determined by the sum of the first component of the mechanical misalignments, described with reference to FIG. 4, and the second component described with reference to FIG. 5. As described with reference to FIGS. 4 and 5 the mechanical misalignments affects the ability to correctly orient the pointing direction PD of the subsystem 30 which will lead to that the orientation of the pointing direction PD will become offset by the first component dP of the mechanical angular misalignment, i.e. along the pitch direction P, and by the second component dR of the mechanical angular misalignment, i.e. along the roll direction R, as compared to an orientation commanded by the command unit 150.

It is to be noted that the mechanical misalignments are typically relatively small but has for illustrative purposes been exaggerated in FIG. 5.

Figure 6:
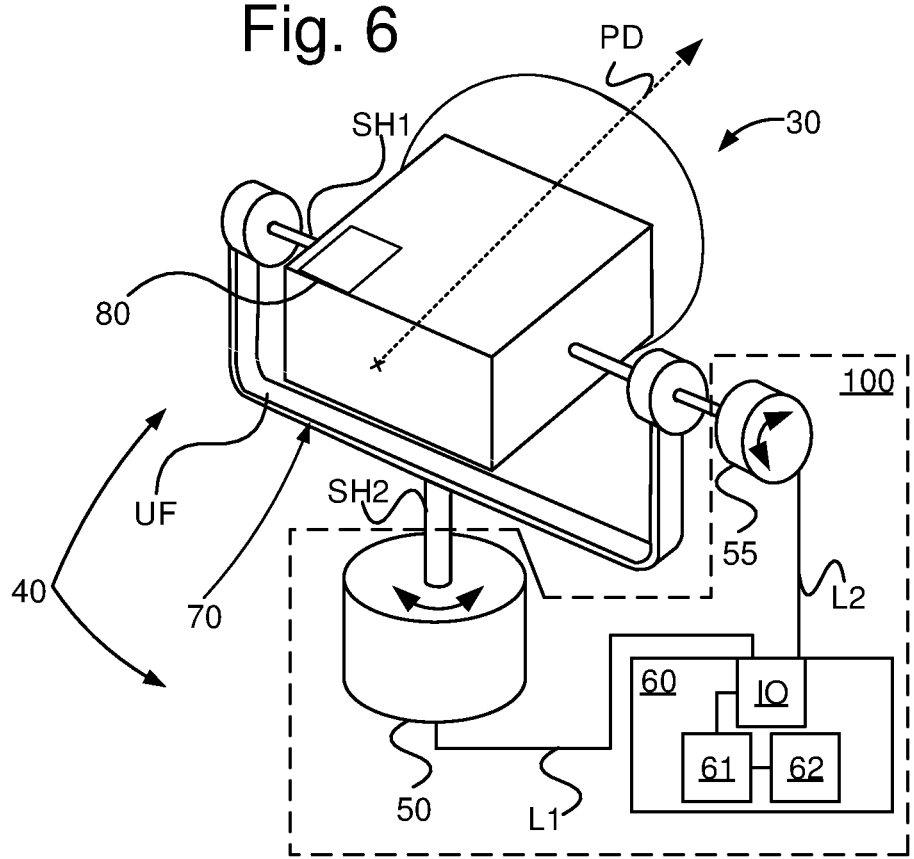
FIG. 6 schematically illustrates a perspective view of the director mount arrangement for supporting, orienting and stabilizing the subsystem, illustrated in FIG. 1A, to be automatically aligned by the director mount arrangement according to an embodiment of the present invention.

FIG. 6 schematically illustrates a perspective view of the director mount arrangement for supporting, orienting and stabilizing the subsystem, illustrated in FIG. 1A, to be automatically aligned by means of the director mount arrangement according to an embodiment of the present invention.

As shown in FIG. 6 the director mount arrangement 40 comprises a, a pivot frame arrangement 70 and a control system 100. The director mount arrangement 40 is arranged mountable, such as arranged mounted, to a platform, such as a platform 10 described in more detail with reference to FIG. 3.

The director mount arrangement 40 is arranged to support a subsystem, such as the subsystem 30 described with reference to FIG. 1A or 3, controllably orient and stabilize the subsystem and to automatically or semi-automatically align the subsystem relative to the platform.

The subsystem, is arranged supported by the pivot frame arrangement 70, the pivot frame arrangement is commonly also often referred to as a cradle or gimbaled support. The pivot frame arrangement 70 is arranged to support a subsystem in the form of the subsystem 30 such as illustrated with reference to FIGS. 1A, 2A-2B and 3. The pivot frame arrangement 70 is arranged to allow orienting the the subsystem arranged to be attached thereto, in direction along two mutually orthogonal axis's, such as two mutually orthogonal axis's in the form of an azimuth axis and an elevation axis, as are described in more detail with reference to FIGS. 2A-2B. The azimuth direction is often also referred to as the bearing direction.

In more detail the pivot frame arrangement 70 comprises a U-frame UF arranged to support the subsystem 30 so as to enable the pivoting functionality of the director mount arrangement 40.

In more detail the pivot frame arrangement 70 is arranged to support the subsystem 30 by means of that the pivot frame arrangement comprises a first shaft SH1 arranged to be fixedly attached to the subsystem 30 and rotatably attached to the U-frame in connection to the end portions of the U-frame. In order for the first shaft to be rotatably attached to the U-frame the first shaft is arranged to extend at least partly into apertures arranged in connection to end portions of the U-frame. This allows the subsystem 30 to rotate around an axis defined by the main direction of extension of the first shaft SH1 corresponding to orientation, i.e. movement of the subsystem, along the elevation direction. Thus, the subsystem 30 is movably attached to the pivot frame arrangement 70. Movement of the subsystem along the elevation direction is caused by inducement of a rotational torque into the first shaft SH1.

The pivot frame arrangement 70 is further arranged fixedly attached to a second shaft SH2. In more detail a central portion of the U-frame of the pivot frame arrangement 70 is arranged fixedly attached to the second shaft SH2. This allows the subsystem 30, upon inducement of a rotational torque into the second shaft SH2, to rotate around an axis defined by the main direction of extension of the second shaft SH2, corresponding to orientation, i.e. movement, along the azimuth direction.

To enable orienting and stabilizing, i.e. controlled movement of the subsystem, and thereby also controlled movement of the subsystem 30 arranged to be mounted to the director mount arrangement via the pivot frame arrangement, the pivot frame arrangement 70 is arranged coupled to a control system 100 of the director mount arrangement.

The control system 100 comprises two servomotors 50, 55 and a control unit 60 for controlling the orientation and stabilization of the subsystem 30 by means of controlling the operation of the servomotors which then causes controlled inducement of rotational torque into the respective shafts.

In more detail the two servomotors comprise an azimuth servomotor 50 and an elevation servomotor 55. The azimuth servomotor 50 is arranged to control the orientation of the subsystem 30 along the azimuth direction and the elevation servomotor 55 is arranged to control the orientation of the subsystem 30 along the elevation direction. This is accomplished by means of that an output shaft, i.e. drive shaft, of the azimuth servomotor is coupled to or constituted by the second shaft SH2 and by means of that that an output shaft, i.e. drive shaft, of the elevation servomotor is coupled to or constituted by the first shaft SH2. Thus, during operation of the servomotors the first and second shafts can be caused to rotate, upon inducement of a rotational torque generated by the servomotors, thereby causing orientation/movement of the subsystem 30 as desired along the azimuth and/or elevation direction by means of control of the servomotors.

The servomotors 50, 55 may comprise electric or hydraulic servomotors coupled to a power supply (not shown) or a pressurized hydraulic oil reservoir arrangement in order to generate energy for providing an output torque.

The azimuth servomotor 50 is coupled via a first connection L1 to the control unit 60 in order to the control unit to be able to generate and provide control signals guiding the operation of the azimuth servomotor 50. The elevation servomotor 55 is coupled via a second connection L2 to the control unit 60 in order to the control unit to be able to generate and provide control signals guiding the operation of the elevation servomotor 55. Thus, servomotors are arranged to control the orientation of the subsystem based on control signals generated by and provided to the servomotors from the control unit 60.

The control signals generated by the control unit for control of the respective servomotors may for example be in the form of torques so as to allow the servomotors to adapt the servomotor angles defining which respective angle the servomotors should drive the respective shafts into.

The control unit 60 comprises at least one storage unit 61, such as at least one random access memory (RAM) and/or buffer memory or other suitable electronic circuits which have the ability to store data. The control unit 60 further comprises at least one processing unit 62, such as at least one central processor (CPU) and/or field programmable gate array (FPGA), and at least one input/output interface 10.

The processing unit 62 is arranged coupled to the storage unit 61 to enable performing read/write operation onto the memory unit 61. The storage unit 61 is coupled to the input/output interface 10 so as to enable performing read/write operations between the storage unit and the input/output interface. For this reason also the input/output interface may comprise a local storage unit and a local processing unit (not shown). Alternatively the processing unit 62 may further be arranged coupled to the input/output interface and arranged to perform the read/write operations between the memory unit 61 and the input/output interface. This enables the control unit 60 to receive, process and transmit information, such as process received information so as to generate and transmit control signals for the servomotors including but not limited to the functionality described with reference to FIGS. 6 and 7.

The storage unit 61 is arranged to store instructions, such as machine readable instruction and/or program instructions, which when executed by the processing unit 62 causes the control unit to control the operation of the servomotors of the director mount arrangement 40, so as to orient, stabilize and automatically align the subsystem 30 when mounted to the director mount arrangement 40, by means of performing the method described below with reference to FIG. 9.

The control unit 60 is further arranged coupled to angular rate sensors 80, such as rate gyros, arranged to sense angular rate information in the form of the angular rate of the subsystem 30. Thus, the angular rate information is indicative of the angular rate of the subsystem 30. The angular rate sensors 80 are arranged in connection to the subsystem so as to sense the angular rate of the subsystem. The angular rate sensors 80 may be arranged in connection to the subsystem by means of being attached to a portion of the surface of the subsystem or by means of being at least partly integrated into the subsystem. Thus, the control unit 60 is arranged to receive angular rate information provided from the angular rate sensors. In more detail the control unit may be arranged to receive said angular rate information by means of the input/output interface 10 of the control unit being arranged coupled to the angular rate sensors via a connection (not shown), which may be a wired or wireless connection.

The angular rate sensors are in more detail arranged to sense the angular rate of the subsystem along two mutually orthogonal sensitivity axis's, wherein said two mutually orthogonal sensitivity axis's may be arranged so that the angular rate sensors sense the angular rate of the subsystem along the azimuth and along elevation the directions.

According to an embodiment the angular rate sensors comprises an azimuth angular rate sensors arranged to sense the angular rate along the azimuth direction and an elevation angular rate sensor arranged to sense the angular rate along the elevation direction. The angular rate sensors may also be comprised of one singular angular rate sensor arranged to sense the angular rate along both the elevation and azimuth direction.

Thus, rather than sensing the exact angle of the orientation of the with respect to a reference frame, such as an earth reference frame, these sense the angular change over time of the subsystem, i.e. angular rate of the subsystem, along the sensitivity axis's of the angular rate sensors, for example the angular rate along the elevation and azimuth direction.

The control unit 60 is arranged connectable, such as arranged coupled, to a command unit of the platform 10, for example arranged coupled to the command unit 150 described in more detail with reference to FIG. 3. This in order to allow an operator of the command unit and/or system associated with the command unit to command the subsystem to assume a certain orientation in the elevation and azimuth direction via interfacing with the control system 100, or in more detail via interfacing with the control unit 60 of the director mount arrangement. Thus, the control unit 60 is arranged to receive orientation operating commands information indicative of a desired orientation of the subsystem or in more detail indicative of a desired orientation of the pointing direction of the subsystem. Upon receiving such orientation operating commands inputted from an operator the control system of the director mount arrangement, in more detail the control unit 60, generates control signals, based on processing said orientation operating commands, causing the servomotors to orient the subsystem into said desired orientation. In more detail the control signals generated by the control unit 60 corresponds information indicating how the servomotors should operate in terms of rotational torque to be applied to the first and/or second shafts SH1, SH2, i.e. how the shafts should be rotated in terms of angles around the main direction of extension of the respective shafts so as to cause the subsystem to be oriented for causing the orientation of the pointing direction of the subsystem to correspond with the orientation commanded from the command unit.

Apart from being arranged to orient the subsystem the control unit is also arranged to stabilize the subsystem. Stabilization of the subsystem prevents the subsystem from un-intended movements which for example could be caused by platform movements.

To achieve said stabilization the control unit is arranged to generate control signals, for control of the orientation of the subsystem, based on the on angular rate information in addition to generating the control signals based on the orientation operating command information, indicative of a desired orientation of the subsystem, provided from an operator of the subsystem via the command unit.

Thus, the control signals generated by the control unit causes movement of the subsystem arranged to move the pointing direction of the subsystem into the latest issued orientation operating command while continuously generating movements counteracting the movements affecting the subsystem caused by movements of the platform onto which the subsystem is mounted via the director mount arrangement. This results in that if the platform remains stationary the control unit generates control signals causing the subsystem to move so as to assume the commanded orientation and if the platform moves and no orientation operating command has been issued for a period of time then the control unit generates control signals causing the subsystem to move so as to counteract the movement of the subsystem caused by the platform movements. In case the platform moves in conjunction with an orientation operating command being issued the control unit may be arranged to generate control signals causing both platform movement counteracting movements and movements related to causing the orientation of the subsystem to assume the commanded orientation. Thus, control signals for counteracting platform movement are generated based on the angular rate information whilst control signals for movement into a commanded orientation is based on the orientation operating command information.

The control unit 60 of the control system 100 is further arranged connectable, such as arranged coupled, to a main gyro of the platform, such as arranged coupled to the main gyro 20 as illustrated with reference to FIG. 3. For example the input/output interface of the control unit 60 of the control system 100 of the director mount arrangement may be arranged coupled to the main gyro of the platform. The coupling from the control unit 60 to the main gyro of the platform may be a physical or wireless coupling.

In more detail the control unit is arranged connectable to a main gyro 20 of the platform in order to receive platform orientation information sensed by the main gyro, indicative of the orientation of the platform.

The control unit is further arranged to generate estimates of the control signals based on the platform orientation information. Thus, apart from generating control signal, i.e. actual control signals, for control of the servomotors based on the angular rate information and the orientation operating command information the control unit is also arranged to generate estimates of the control signals, i.e. estimates of the control signals generated for the servomotors, based on the platform orientation information. Thus, the estimated control signals are not based on the angular rate information provided from the angular rate sensors and not based on the orientation operating command information provided from the command unit.

In absence of movements of the subsystem resulting from issued orientation operating commands the movements of the subsystem, caused by the stabilization functionality of the control unit, substantially correspond to the movements of the platform whereby the actual control signals, generated based on the angular rate information related to the subsystem and transferred to the servomotors, should correspond to the estimates of the control signals generated by the control unit based on the platform orientation information provided from the main gyro. Deviations between the actual control signals and the estimates of the control signals indicate mechanical misalignments of the subsystem relative to the platform. For this reason the control unit is further arranged to determine a difference between the control signals, i.e. actual control signals, and the estimates of the control signals. Said difference being indicative of mechanical misalignments of the subsystem relative to the platform, such as indicative of the mechanical misalignments dP, dR described in more detail with reference to FIGS. 5 and 6. This is described in more detail with reference to FIG. 7.

Said control unit further being arranged to generate alignment corrections based on the determined difference. Thus, the alignment corrections compensate for the mechanical misalignments so as to automatically align the subsystem relative to the platform.

Accordingly, by having access to information related to the mechanical misalignments and the determined alignment corrections the control unit can apply these alignments corrections when generating the control signals for the servomotors in response to receiving orientation operating command information so as to ensure that the subsystem becomes and remains oriented as desired, i.e. as determined by the received orientation operating command information without offsets being introduced due to the mechanical misalignments, i.e. appropriate compensations for the mechanical misalignments is applied by the control unit. This means that the director mount arrangement enables to automatically align the subsystem relative to the platform.

The above described determination of the difference between the control signals and the estimated control signals and the generation of the alignment corrections performed by the control unit are described in more detail with reference to FIG. 7.

It is to be noted that the pivot frame arrangement 70 may be constructed in a different fashion as compared to what is described with reference to FIG. 6 without departing from the scope of the present invention. As an example the dimensioning/shaping of the pivotable frame arrangement may be different and the servomotors may at least partly be integrated into the pivot frame arrangement, for example at least partly extending into apertures of the pivot frame arrangement. The elevation servomotor can be fixedly attached to a portion of the pivot frame arrangement. Also the placement of the angular rate sensor may differ from the placement illustrated in FIG. 6. The angular rate sensors may for example be placed at least partly integrated into the subsystem or arranged in connection to a different portion of the subsystem.

Furthermore, it is to be noted that the director mount arrangement 40 may be constructed in a different fashion as compared to what is described with reference to FIG. 6. The director mount arrangement 40 may comprise a base plate, such as a base plate element 35 described with reference to FIG. 1B, for supporting director mount arrangement 40 and for allowing mounting of the director mount arrangement 40 to the platform. A portion of the base plate may for example be arranged fixedly attached to the azimuth servomotor 50 for support of the azimuth servomotor and the director mount arrangement. The director mount arrangement may also comprise a housing or casing arrangement, arranged to encapsulate at least parts of the director mount arrangement. The housing may also serve as a support for the servomotors so as to support and fixate the servomotors to the director mount arrangement.

Also the control unit 60 of the control system 100 may be constructed in a different fashion as compared to what is described with reference to FIG. 6. For example one or more functions of the control unit, such as functions described with reference to FIG. 7 may rather than being performed by the processing unit 62 interfacing with the memory unit and/or the input/output interface at least in part be performed in one or more separate modules (not shown) such as embedded circuitry modules or other suitable data processing modules.

Figure 7:
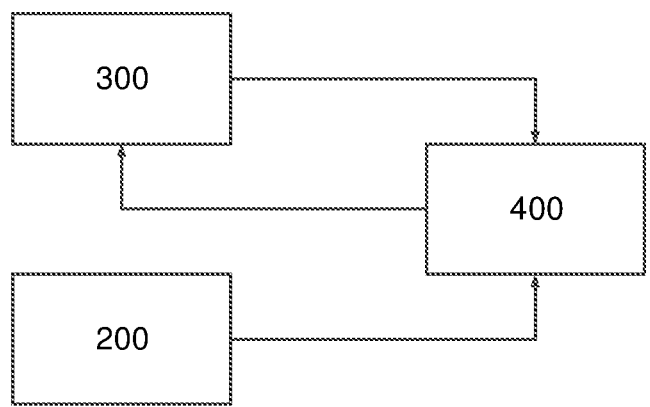
FIG. 7 schematically illustrates functional schematics of the control unit of the director mount arrangement, illustrated in FIG. 6, for automatic alignment of a subsystem according to an embodiment of the present invention.

FIG. 7 schematically illustrates functional schematics of the control unit of the director mount arrangement, illustrated in FIG. 6, for automatic alignment of a subsystem according to an embodiment of the present invention.

A number of functional modules, involved in the automatic alignment of the subsystem performed by the control unit, together with interactions between the functional modules are shown in FIG. 7. The functional modules may at least partly be implemented as independent modules each comprising hardware/software for enabling a functionality of the respective module. However, the functional modules are preferably implemented as machine readable instructions stored in a memory unit and executed by a processing unit, such as stored in the memory unit 61 and arranged to be executed by the processing unit 62 of the control unit 60 as described with reference to FIG. 6. Thus, the functional modules, when operated, jointly provides the functionality of determination of mechanical misalignments associated with the subsystem/director mount arrangement relative to the platform, as described with reference to FIGS. 4-6, and generation of appropriate alignment corrections so as to automatically align the subsystem with the platform, as described with reference to FIG. 6.

The number of functional modules comprises a servo control loop module 200, a transformation and estimation module 300 and a correction determination module 400.

The servo control loop module 200 is arranged to perform the functionality described above with regard to orienting and stabilizing the subsystem 30 based on the orientation operating command information and the angular rate information. Accordingly, the servo control loop module is the part of the control system 100, described with reference to FIG. 6, which generates the control signals, i.e. the actual control signals, for the servomotors. Thus, the control signals generated from the servo control loop module 200 are arranged to be transmitted to the servomotors of the control system 100, such as transmitted to the servomotors via the I/O interface 10 of the control unit.

The servo control loop module 200 is further arranged to initialize the automatic alignment of the subsystem relative to the platform. In more detail the alignment initialization module is arranged to initialize the automatic alignment following receipt of a trigger signal. The trigger signal causing initialization of the automatic alignment could be generated by an operator using input means of a command unit, such as input means of the command unit 150 described with reference to FIG. 4.

The trigger signal could alternatively be generated via input means, such as input means in the form of a physical button arranged in connection to the director mount arrangement or be generated by the servo control loop module based on a predetermined alignment schedule, such as a predetermined alignment schedule made accessible to the servo control loop module by being stored in the memory unit 61 of the control unit or made accessible by being stored in the command unit. In case the trigger signal is generated by or made accessible via the command unit the servo control loop module is arranged communicatively coupled to the command unit so as to enable receiving said trigger signal, such as arranged communicatively coupled to the command unit via the memory unit 61 and the input/output interface 10 of the control unit 60.

Following receipt of the trigger signal the servo control loop module is arranged to trigger blocking of the orientation operating commands. In more detail the servo control loop module is arranged, following receipt of the trigger signal to trigger blocking of the orientation operating commands so that the control signals, i.e. actual control signals, are un-affected by any orientation operating command issued during the initialized automatic alignment procedure. Thus, while the automatic alignment procedure is initialized and active the only control signals, i.e. actual control signals, generated by the servo control loop module are control signals solely arranged to counteract movement of the subsystem as sensed by the angular rate sensors.

According to an embodiment the servo control loop module is further arranged to trigger operations of the transformation and estimation module 300 and the correction determination module 400, whose operations are described in more detail below. For this purpose the servo control loop module is preferably arranged communicatively coupled to one or more of the correction determination module and the transformation and estimation module. For example the servo control loop module may be communicatively coupled to the correction determination module so as to trigger the operations thereof whilst the transformation and estimation module may be arranged to operate at all times or the servo control loop module may be communicatively coupled to both said modules for triggering of the operations thereof or the servo control loop module may be communicatively coupled to the transformation and estimation module so as to enable triggering the operations thereof, whereby the transformation and estimation is communicatively coupled to the correction determination module so as to enable triggering the operations thereof.

According to another embodiment the servo control loop module 200, the transformation and estimation module 300 and the correction determination module 400 are arranged on-line at all times, i.e. arranged to actively perform processing at all times. According to this embodiment the above described trigger signal causes the servo control loop module to block orientation operating commands and the correction determination module to store a determined difference after a period of time.

The servo control loop module could also be arranged, upon receipt of the trigger signal, to trigger a maneuver of the platform to be performed during the period of time for which the automatic alignment is performed, as described in more detail with reference to FIG. 8. For this purpose the servo control loop module may be communicatively coupled to a steering/navigation system of the platform, either directly or via the command unit. Alternatively, the command unit is arranged to trigger the maneuver of the platform in conjunction with generation of the trigger signal for the servo control loop module so as to initialize automatic alignment.

During the period of time when the automatic alignment takes place the servo control loop module and/or associated control unit is arranged to block generation of control signals for the servomotors based on any orientation operating commands received from the command unit. However, to enable reacting, by means of the subsystem, to an imminent threatening situation the command unit could feature an override functionality which once activated, by an operator of the command unit, causes generation of an override signal for the servo control loop module and/or associated control unit causing the servo control loop module and/or associated control unit to abort performance of an ongoing automatic alignment so as to enable orienting the subsystem by means of the orientation operating commands.

The transformation and estimation module 300 is arranged to process received information in the form of the platform orientation information. The platform orientation information received by the transformation and estimation module relates to the platform orientation determined by the main gyro 20 of the platform as described with reference to FIG. 4. In order to receive said information the transformation and estimation module is arranged communicatively coupled to an input/output interface, such as the input/output interface 10 of the control unit 60 as described with reference to FIG. 6. In more detail the transformation and estimation module is arranged to process the received platform orientation information so as to transform the received platform orientation information from Euler angles into a horizontal coordinate system, i.e. into elevation and azimuth angles.

The transformation and estimation module is further arranged to generate estimates of the control signals for the servomotors based on the platform orientation information. In contrast to the control signals, i.e. actual control signals, these estimates of the control signals are not intended to be sent to the servomotors. To generate the estimates of the control signals the transformation and estimation module is arranged to process a predetermined dynamic model of the director mount arrangement. The predetermined dynamic model of the director mount arrangement may be accessible to the transformation and estimation module via being stored on a memory unit such as the memory unit 61 of the control circuit 60.

The dynamic model, when processed, is arranged to generate observable states in the form of estimates of the control signals. In more detail the dynamic model is defined as a function of a number of parameters comprising parameters related to the current pointing direction of the subsystem, the current platform orientation information and a difference of the platform orientation over time. The model parameters with respect to current platform orientation information and the difference of the platform orientation over time can be provided by the platform orientation information as sensed by the main gyro transformed into a horizontal coordinate system. The current orientation of the pointing direction of the subsystem parameter of the dynamic model is arranged to be initialized based on using existing knowledge of the pointing direction of the subsystem such as based on existing knowledge in the form of the latest issued orientation operating command. Furthermore, the parameter related to the current pointing direction is assumed to be constant in the model. Even though that this latest issued orientation operating command information do not fully reflect how the pointing direction of the subsystem is actually oriented, this information suffice for initialization of the model. Thus, when processing the dynamic model estimates of the control signals, generated by the servo control loop, are generated by the transformation and estimation module. Accordingly, the output from the transformation and estimation module are the estimated control signals that corresponds to what the actual control signals, i.e. the torque information associated with the servomotor angles, should be as determined from the platform orientation information.

According to an example the transformation and estimation module 300 is arranged to use Kalman filtering so as to determine said estimated control signals.

The correction determination module 400 is arranged to automatically generate alignment corrections based on determining a difference between the generated control signals, i.e. actual control signals, and the estimated control signals, i.e. the estimates of the control signals. For this purpose the correction determination module is arranged communicatively coupled to the transformation and estimation module so as to allow receiving the generated estimated control signals, and arranged communicatively coupled to the servo loop control module so as to allow receiving the generated control signals, i.e. actual control signals.

Preferably the determination of the difference between the control signals, actual control signals, and the estimates of the control signals is performed by the correction determination module over a period of time.

According to an example of the above described embodiment the correction determination module 400 is arranged to apply Kalman filtering, i.e. perform estimations, for the determination of the difference between the control signals and the estimated control signals.

Upon having determined the difference between the control signals and the estimated control signals the correction determination module is arranged to generate alignment corrections based on the determined difference. After the alignment corrections have been satisfactorily been determined these alignment corrections are arranged to be stored locally in the control unit, such as arranged to be stored, by the correction determination module, the transformation and estimation module or the control unit, such as in the memory unit of the control unit for subsequent use by the control unit. Also after alignment corrections have been satisfactorily determined the control unit is arranged to resume its normal functionality i.e. controlling the orientation of the subsystem by means of the orientation operating commands generated by the command unit. The generated alignments corrections can then be used, such as used by the control unit described with reference to FIG. 6, to apply corrections in conjunction when generating control signals, i.e. actual control signals, for causing the servomotors of the director mount arrangement to orient the subsystem into a desired orientation, such a desired orientation inputted via the command unit without being offset due to the mechanical misalignment. Thus, the automatic alignments performed by the director mount arrangement, or in more detail performed by the control unit of the director mount arrangement, intended for compensating for the mechanical misalignments described with reference to FIGS. 4-5 could be said to correspond to an automatic parametric calibration of the director mount arrangement. Thus, no mechanical adjustments are required in order to compensate for the mechanical misalignments.

According to an example of the above described embodiment with continued reference to FIG. 7, the correction determination module is arranged to stepwise determine the difference between the generated control signals and the estimated control signals. In this example the correction determination module is arranged to generate the alignment corrections based on estimations of the difference between the generated control signals, i.e. actual control signals, and the estimated control signals and feedback said alignment corrections to the transformation and estimation module. For this reason the correction determination module is arranged communicatively coupled to the transformation and estimation module. Upon receiving the alignment correction feedback the transformation and estimation module is arranged to apply said alignment corrections to the platform orientation information once transformed into the horizontal coordinate system where after a new determination of the difference between the control signals and the estimated control signals is performed in order for the correction determination module to generate updated alignment corrections for feedback to the transformation and estimation module.

The above described feedback loop could be arrange to be continued until the determined difference falls within an acceptable tolerance level. The generated alignment corrections causing the determined difference to fall within the acceptable tolerance level could then be used by the control unit of the director mount arrangement for applying compensations to orientation operating commands, such as the orientation operating commands generated by the command unit 150 as described with reference to FIG. 3, to appropriately compensate from the mechanical misalignments. Without such compensation the orientation of the subsystem supported by the director mount arrangement would become offset with respect to said orientation operating command. Also for this example the correction determination module could be arranged to apply Kalman filtering for determining the difference between the platform orientation information and the angular rate information.

Since time delays may negatively influence the accuracy of the automatic alignment procedure the platform orientation information received from the main gyro and the control signals are preferably arranged with time stamps. By arranging the platform orientation information also the estimated control signals can easily be provided with time stamps since the estimated control signals are based on the platform orientation information.

Figure 8:
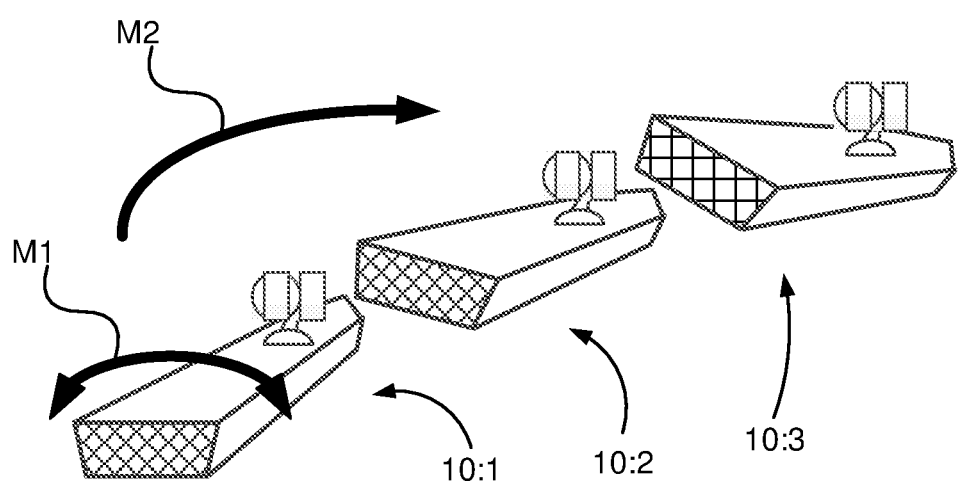
FIG. 8 schematically illustrates a platform maneuver used by the director mount arrangement, described with reference to FIGS. 6-7, for facilitating automatic alignment of the subsystem according to an embodiment of the present invention.

FIG. 8 schematically illustrates a platform maneuver used by the director mount arrangement, described with reference to FIGS. 6-7, for facilitating automatic alignment of the subsystem according to an embodiment of the present invention.

The automatic alignment procedure associated with the control unit 60 of the control system 100 of the director mount arrangement 40 as described with reference to FIGS. 6 and 7 is dependent, in terms of accuracy of the determined mechanical misalignments, on the presence of platform movements. Movements of the platform caused by normal maneuvering and/or waves will suffice for the performance of the determination of the mechanical misalignments. However, to facilitate automatically aligning the subsystem by means of the director mount arrangement, i.e. the director mount arrangement 40 described in more detail with reference to FIGS. 6 and 7, the platform is preferably arranged to perform a predetermined maneuver while the automatic alignment performed by the director mount arrangement, as described in more detail with reference to FIGS. 6 and 7, takes place.

Thus, the control unit of the director mount arrangement, as described in more detail with reference to FIGS. 6 and 7, is arranged to perform the automatic alignment of the subsystem relative to the platform while the subsystem, as described in more detail with reference to FIGS. 6 and 7, is blocked from performing movements due to issued orientation operating commands and while the platform performs moves, preferably by performing a predetermined maneuver. However sufficient platform movements, in terms of achieving acceptable accuracy for the automatic alignment procedure, could also as described above result from for example normal maneuvering or due to the platform being affected by waves/currents.

Platform maneuvers as described above allows full observability of parameters, i.e. full observability of the parameters involved in the dynamic model described with reference to FIG. 7, involved in determining the mechanical misalignments. In more detail without any platform movement, such as for example caused by the maneuver, the angular rate sensors of the director mount arrangement, as described in more detail with reference to FIGS. 6 and 7, will sense zero or close to zero angular rate and the main gyro of the platform will sense the current angles of orientation but zero or close to zero angular rate whereby the control signals and the estimated control signals do not allow for comparison so as to determine the mechanical misalignments. Accordingly in order to be able to accurately determine the difference between the control signals for the servomotors, and the estimated control signals, as required for performing the automatic alignment of the subsystem relative to the platform the platform needs to move, i.e.

move so as to cause the values of the control signals and the estimated control signals to become larger than zero.

According to an example of this embodiment the predetermined platform maneuver comprises a maneuver M1, M2 in the form of a combined roll motion M1 and turn motion M2 of the platform. According to this embodiment the roll motion M1 comprises a roll motion with amplitude in a range of +/−1-5 degrees for a roll period in a range of 1-30 seconds. Further according to this embodiment the turn motion M2 comprises a turn motion having a turn rate in a range of +/−1-10 degrees per second.

According to a preferred embodiment the predetermined maneuver comprises a combined roll and turn motion, wherein the roll motion lies within the range of +/−3-5 degrees over a roll period in a range of 4-7 seconds and wherein the turn rate of the turn motion lies within the range of +/−3-7 degrees per second.

An example of the above described platform maneuver wherein platform is shown in FIG. 8, wherein the platform is illustrated at a first 10:1, a second 10:2 and a third 10:3 subsequent instants of time of the platform maneuver wherein the orientation of the platform differs for the different instants of time due to the maneuver.

The above described platform maneuver is arranged to be initiated following issuance of a trigger signal such as a trigger signal issued from a command unit of the platform, such as the command unit 150 described with reference to FIG. 3. The initiation may for example be caused by an operator pressing a button or switch on the command unit so as to cause a control system, of the platform, affecting steering/propulsion of the platform to perform the maneuver. Upon initiation of the platform maneuver the command unit is further arranged to transmit an initiation signal to the control unit of the director mount arrangement, causing the control unit to block movement of the subsystem related to orientation operating commands and perform the automatic alignment of the subsystem as described in more detail with reference to FIGS. 6 and 7.

FIG. 9 schematically illustrates a flow diagram of a method for automatically aligning the subsystem, as described with reference to FIGS. 1 and 3, relative to a platform by means of the director mount arrangement as described with reference to FIGS. 6 and 7 according to an embodiment of the present invention.

In a first step S1, angular rate information is received. In more detail the angular rate information is indicative of the angular rate of a subsystem, as described in more detail with reference to FIG. 6. The angular rate information is provided from angular rate sensors, such as the angular rate sensors 80 described in more detail with reference to FIG. 6, of the director mount arrangement. The angular rate information is received in a control unit, such as the control unit 60 described in more detail with reference to FIG. 6. After the first step S1 a second step S2 is subsequently performed.

In the second step S2, orientation operating commands are received. In more detail orientation operating command information, indicative of a desired orientation of the subsystem, provided from an operator of the system via a command unit, such as the command unit 150 described in more detail with reference to FIG. 3, is received in the control unit. After the second step S2 a third step S3 is subsequently performed.

In the third step S3, control signals are generated. In more detail control signal for servomotors, such as the servomotors 50 and 55 described in more detail with reference to FIG. 6, of the director mount arrangement 40, are generated by the control unit 60 based on the received angular rate information and the received orientation operating command information, so as to cause the servomotors to orient and stabilize a subsystem, such as the subsystem 30 described in more detail with reference to FIG. 1A. After the third step S3 a fourth step S4 is subsequently performed.

In the fourth step S4, platform orientation information is received. In more detail platform orientation information, indicative of the orientation of the platform, provided from a main gyro, such as the main gyro 20 connectable to the control unit 60 described in more detail with reference to FIG. 3, is received in the control unit. After the fourth step S4 a fifth step S5 is subsequently performed.

In the fifth step S5, control signals are estimated. In more detail control signals are estimated by the control unit/servo loop control module, as described with reference to FIGS. 6 and 7, based on the received platform orientation information used together with a dynamic model. After the fifth step S5 a sixth step S6 is subsequently performed.

In the sixth step S6, a difference is determined. In more detail a difference between the control signals, i.e. actual control signals, and the estimated control signals is determined by the control unit. Said difference being indicative of mechanical misalignments, such as the mechanical misalignments dP, dR of the subsystem relative to the platform described in more detail with reference to FIGS. 4-5. After the sixth step S6 a seventh step S7 is subsequently performed.

In the step S7, alignment corrections are generated. In more detail alignment corrections are generated by the control unit based on the determined difference between the control signals and the estimated control signals, wherein said alignment corrections compensate for the mechanical misalignments so as to automatically align the subsystem relative to the platform. After the seventh step the method may end or be performed again so as to provide new alignment corrections. In more detail after the seventh step has been performed, i.e. when alignment corrections have been satisfactorily determined the control unit is resumes its normal functionality, i.e. controlling the orientation of the subsystem by means of the orientation operating commands generated by the command unit wherein the alignment corrections can be used for compensating for the mechanical misalignments, until a new automatic alignment so as to provide new alignment corrections is desired whereby steps S1-S7 are repeated.

Preferably, the sixth step S6 is performed in conjunction with that, i.e. while, the subsystem is blocked from movements caused by orientation operating commands and while the platform performs a maneuver.

Preferably, the sixth step S6 is preceded by a step comprising that coordinate transformations are applied, by the control unit, to the received platform orientation information so as to transform the received platform orientation information into a horizontal coordinate system. For example transforming pitch P, roll R and heading H into elevation and azimuth.

According to an example, the sixth step in the form of determining the difference between the control signals and the estimated control signals is arranged to be performed by means of the control unit performing Kalman filtering so as to determine the difference.

According to an example, the fifth step in the form of generating the estimated control signals is arranged to be performed by means of the control unit performing Kalman filtering so as to generate the estimates.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A director mount arrangement for automatic alignment of a subsystem relative to a platform, wherein said director mount arrangement is arranged mountable to the platform and to pivotably support the subsystem, said director mount arrangement comprising:
   a pivot frame arrangement for pivotably supporting the subsystem, and
   a control system for controllably orienting and stabilizing the subsystem, wherein said control system comprises:
   servomotors arranged to control the orientation of and stabilize the subsystem, and
   a control unit arranged to generate control signals, for the servomotors, based on angular rate information, indicative of the angular rate of the subsystem, received from one or more angular rate sensors arranged in connection to the subsystem, and based on orientation operating command information, indicative of a desired orientation of the subsystem, provided from an operator of the subsystem,
   wherein the control unit is arranged connectable to a main gyro of the platform in order to receive platform orientation information, indicative of the orientation of the platform,
   wherein the control unit further is arranged to generate estimates of the control signals based on the platform orientation information and determine a difference between the control signals and the generated estimated control signals, said difference being indicative of mechanical misalignments of the subsystem relative to the platform, said control unit further being arranged to generate alignment corrections based on the determined difference,
   wherein said alignment corrections compensate for the mechanical misalignments so as to automatically align the subsystem relative to the platform.

2. The arrangement according to claim 1, wherein the control unit is arranged to apply coordinate transformations, to the platform orientation information provided from the main gyro, transforming the platform orientation information into a horizontal coordinate system so as to enable generating the estimates of the control signals.

3. The arrangement according to claim 1, wherein the control unit is arranged to apply Kalman filtering so as to generate the estimates and/or to determine the difference.

4. The arrangement according to claim 1, wherein the control unit is arranged to determine a difference between control signals and the estimated control signals while the subsystem is blocked from movements caused by the orientation operating commands and while the platform performs a maneuver.

5. The arrangement according to claim 1, wherein the servomotors comprise an azimuth servomotor for controlling the orientation of the subsystem in an azimuth direction and an elevation servomotor for controlling the orientation of the subsystem in an elevation direction.

6. The arrangement according to claim 1, wherein the angular rate sensors comprise an azimuth angular rate sensor for sensing the angular rate of the subsystem along an azimuth direction and an elevation angular rate sensor for sensing the angular rate of the subsystem along an elevation direction.

7. The arrangement according to claim 1, wherein the director mount arrangement is operated from a command unit associated with the platform, whereby the director mount arrangement is arranged connectable to the command unit.

8. A method for automatic alignment of a subsystem relative to a platform, wherein the subsystem is pivotably supported by a director mount arrangement for orienting and stabilizing the subsystem, said director mount arrangement being mountable to the platform, the method comprising the steps of:
   receiving, in a control unit of the director mount arrangement, angular rate information, indicative of an angular rate of the subsystem, provided from angular rate sensors;
   receiving, in the control unit, orientation operating command information, indicative of a desired orientation of the subsystem, provided from an operator of the system,
   generating, in the control unit, control signals for servomotors, of the director mount arrangement, based on the received angular rate information and the received orientation operating command information, so as to cause the servomotors to orient and stabilize the subsystem,
   wherein the steps of:
   receiving, in the control unit, platform orientation information, indicative of the orientation of the platform, provided from a main gyro, of the platform, connectable to the control unit;
   generating, in the control unit, estimates of the control signals based on the platform orientation information, determining, in the control unit, a difference between the generated control signals and the generated estimated control signals, wherein said difference is indicative of mechanical misalignments of the subsystem relative to the platform; and
   generating, in the control unit, alignment corrections based on the determined difference, wherein said alignment corrections compensate for the mechanical misalignments so as to automatically align the subsystem relative to the platform.

9. The method according to claim 8, wherein the step of determining the difference is performed while the subsystem is blocked from movements caused by the orientation operating commands and while the platform performs a maneuver.

10. The method according to claim 8, wherein the step of determining the difference and/or the step of generating the estimates of the control signals is performed by means of the control unit performing Kalman filtering.

11. The method according to claim 8, further comprising the step of applying coordinate transformations to the platform orientation information so as to transform the platform orientation information into a horizontal coordinate system.

12. A non-transitory computer storage medium storing computer-executable instructions for automatic alignment of a subsystem pivotably supported by a director mount arrangement mountable to a platform, said director mount arrangement comprising instructions, which when executed by a computer cause the computer to perform one or more operations, wherein the one or more operations, comprising:

receiving angular rate information indicative of an angular rate of the subsystem, provided from angular rate sensors;

receiving orientation operating command information, indicative of a desired orientation of the subsystem, provided from an operator of the system;

generating control signals for servomotors based on the received angular rate information and the received orientation operating command information, so as to cause the servomotors to orient and stabilize the subsystem;

receiving platform orientation information, indicative of the orientation of the platform, provided from a main gyro;

generating estimates of the control signals based on the platform orientation information;

determining a difference between the generated control signals and the generated estimated control signals, wherein said difference is indicative of mechanical misalignments of the subsystem relative to the platform; and generating in the control unit, alignment corrections based on the determined difference, wherein said alignment corrections compensate for the mechanical misalignments so as to automatically align the subsystem relative to the platform.

13. A platform comprising:

a director mount arrangement, the director mount arrangement comprising:

a pivot frame arrangement for pivotably supporting the subsystem, and a control system for controllably orienting and stabilizing the subsystem, wherein said control system comprises:

servomotors arranged to control the orientation of and stabilize the subsystem, and a control unit arranged to generate control signals, for the servomotors, based on angular rate information, indicative of the angular rate of the subsystem, received from one or more angular rate sensors arranged in connection to the subsystem, and based on orientation operating command information, indicative of a desired orientation of the subsystem, provided from an operator of the subsystem, wherein the control unit is arranged connectable to a main gyro of the platform in order to receive platform orientation information, indicative of the orientation of the platform, wherein the control unit further is arranged to generate estimates of the control signals based on the platform orientation information and determine a difference between the control signals and the generated estimated control signals, said difference being indicative of mechanical misalignments of the subsystem relative to the platform, said control unit further being arranged to generate alignment corrections based on the determined difference, wherein said alignment corrections compensate for the mechanical misalignments so as to automatically align the subsystem relative to the platform.

* * * * *